US012111231B2

(12) United States Patent
Wu et al.

(10) Patent No.: US 12,111,231 B2
(45) Date of Patent: Oct. 8, 2024

(54) HELIUM DETECTION DEVICE AND HELIUM DETECTION EQUIPMENT

(71) Applicant: Wuxi Lead Intelligent Equipment Co., Ltd., Jiangsu (CN)

(72) Inventors: Jianping Wu, Jiangsu (CN); Song Wang, Jiangsu (CN); Yizhou Sun, Jiangsu (CN)

(73) Assignee: Wuxi Lead Intelligent Equipment Co., Ltd., Jiangsu (CN)

( * ) Notice: Subject to any disclaimer, the term of this patent is extended or adjusted under 35 U.S.C. 154(b) by 0 days.

(21) Appl. No.: 18/617,603

(22) Filed: Mar. 26, 2024

(65) Prior Publication Data

US 2024/0247994 A1    Jul. 25, 2024

Related U.S. Application Data

(63) Continuation of application No. PCT/CN2021/140324, filed on Dec. 22, 2021.

(51) Int. Cl.
*G01M 3/04*    (2006.01)
*H01M 10/42*    (2006.01)

(52) U.S. Cl.
CPC ......... *G01M 3/04* (2013.01); *H01M 10/4228* (2013.01)

(58) Field of Classification Search
CPC ....... G01M 3/04; G01M 3/22; H01M 10/4228
See application file for complete search history.

(56) References Cited

U.S. PATENT DOCUMENTS

2003/0207169 A1*  11/2003  Tukawaki .........  H01M 10/4285
                                            429/90

FOREIGN PATENT DOCUMENTS

CN            110091269 A        8/2019

* cited by examiner

*Primary Examiner* — David Z Huang
(74) *Attorney, Agent, or Firm* — Baker Botts LLP

(57) ABSTRACT

Disclosed are a helium detection device and a helium detection equipment. The helium detection device includes a helium injection mechanism, a replacing mechanism and a finger-clamp mechanism, a sealing nozzle can be plugged into one end of a helium injection tube of the helium injection mechanism, and the finger-clamp mechanism includes a clamping assembly capable of clamping or releasing the sealing nozzle.

20 Claims, 8 Drawing Sheets

HELIUM DETECTION DEVICE AND HELIUM DETECTION EQUIPMENT

RELATED APPLICATIONS

The present application is a continuation of International Application No. PCT/CN2021/140324 filed on Dec. 22, 2021, which claims priority to Chinese patent application No. 202110824783.5 entitled "Helium Detection Device" which was filed on Jul. 21, 2021, and the Chinese patent application No. 202121670147.3 entitled "Helium Injection Device and Helium Detection Equipment" which was also filed on Jul. 21, 2021, all of which are hereby incorporated by reference in their entireties.

TECHNICAL FIELD

The present application relates to the field of airtightness inspection, in particular to a helium detection device and helium detection equipment.

BACKGROUND

Airtightness inspection is often required in production and processing of various products such as a square battery. A common means for airtightness inspection is helium detection. Helium detection involves operations such as filling/recycling of helium into/from products to be inspected in a vacuum chamber. An end of a helium injection tube is usually inserted with a sealing nozzle, which enables a good sealing between the tube and a helium injection port of the products to be inspected so as to ensure airtightness during helium injection.

A sealing nozzle is typically formed from a flexible material such as silicone and rubber, which is prone to material fatigue failure after repeated use and must be replaced. At present, a common choice is manual replacement of a sealing nozzle, which however is inefficient and therefore brings negative influence to normal production schedule.

In addition, existing helium detection equipment requires complex pipelines for connections and on-off control in order to accommodate the multi-step operation as described above. The complex pipelines result in a complex structure, where redundant pipelines are prone to adsorb a large amount of helium, thus having negative influence on helium detection accuracy.

SUMMARY

Based on this, it is necessary to provide, in response to the above problems, a helium detection device that can improve efficiency of replacing a sealing nozzle, and a helium detection equipment that can improve accuracy of detecting helium.

In order to solve the above problems, the present application provides a technical solution of providing a helium detection device, including:
- a helium injection mechanism including a helium injection tube provided at a helium injection station, one end of the helium injection tube being capable of being plugged into by a sealing nozzle;
- a replacing mechanism including a discharging assembly for outputting the sealing nozzle and a recycling assembly for picking up the sealing nozzle, the discharging assembly being provided at a feeding station, and the recycling assembly being provided at a recycling station; and
- a finger-clamp mechanism including a clamping assembly capable of clamping or releasing the sealing nozzle and capable of moving to the helium injection station, the discharging station and the recycling station so as to replace the sealing nozzle plugged into the helium injection tube.

In one embodiment, the finger-clamp mechanism has a first station and a second station spaced apart, and the clamping assembly is provided at each of the first station and the second station, the clamping assembly located at the second station being configured for capturing the sealing nozzle output by the discharging assembly and transferring the sealing nozzle to the helium injection tube, the clamping assembly located at the first station being configured for capturing the sealing nozzle plugged into the helium injection tube and transferring the sealing nozzle to the recycling assembly.

In one embodiment, the clamping assembly can drive the clamped sealing nozzle to move along an axial direction of the helium injection tube, so as to plug the sealing nozzle into the helium injection tube or to pull out the sealing nozzle from one end of the helium injection tube.

In one embodiment, the clamping assembly includes a strut capable of bearing the sealing nozzle, and a clamping-jaw that is circumferentially provided around the strut and can be opened or closed.

In one embodiment, the finger-clamp mechanism further includes an elevating assembly capable of driving the clamping assembly up and down along an axial direction of the strut, thereby the sealing nozzle stretching into or withdrawing from the clamping-jaw.

In one embodiment, the discharging assembly includes:
- a discharging tube for storing the sealing nozzle, the discharging tube being provided with a discharging port at one end of the discharging tube, a plurality of sealing nozzles being stacked on the discharging tube and able to slide down to the discharging port under the influence of gravity;
- an on-off member having a blocking state that prevents the sealing nozzle from sliding out of the discharging port and an open state that allows the sealing nozzle to slide out of the discharging port, the on-off member being able to switch between the blocking state and the open state.

In one embodiment, the on-off member includes a jack-up block and a discharging cylinder, the jack-up block being provided on a driving end of the discharging cylinder and configured to be slidable through a side wall of the discharging tube, the discharging cylinder being capable of driving the jack-up block to insert into or withdraw from the discharging tube such that the on-off member can be switched between the blocking state and the open state.

In one embodiment, a feeding port is provided on a side wall of the discharging tube away from the discharging port, a plug pin is provided on an inner wall of the feeding port, and when the sealing nozzle passes through the feeding port in a preset orientation, the groove on the sealing nozzle constitutes an avoidance of the plug pin.

In one embodiment, the recycling assembly includes an attracting member capable of attracting and releasing the sealing nozzle.

In one embodiment, further including a driving mechanism and a lower cavity mechanism, the driving mechanism being capable of driving the finger-clamp mechanism to the helium injection station, the discharging station and the recycling station, the lower cavity mechanism being linked with the finger-clamp mechanism and capable of moving to the helium injection station under the driving of the driving mechanism.

In one embodiment, the helium injection mechanism further includes an isolation valve, the helium injection tube is provided with an injection port at one end of the helium injection tube, and the isolation valve is fixed on one end of the helium injection tube away from the injection port and is in communication with the helium injection tube; and the helium detection device further includes a four-position two-way valve with an air inlet and four air outlets, the air inlet being capable of conducting with the four air outlets alternately;

wherein, the air inlet is connected to the helium injection tube through the isolation valve, and the four air outlets are configured to connect respectively to a helium filling device, a helium returning device, a vacuum pumping device and a vacuum breaking device.

In one embodiment, the helium injection mechanism includes a fixed base, and the helium injection tube is installed on the fixed base and can stretch out and draw back along a longitudinal direction of the injection port relative to the fixed base.

In one embodiment, the helium injection mechanism further includes a mounting plate and an elastic part, the mounting plate is installed on the fixed base in such a way as to be slidable along the longitudinal direction of the injection port, the helium injection tube is fixedly provided on the mounting plate, and the elastic part provides an elastic force on the mounting plate along the longitudinal direction of the injection port and away from the fixed base.

In one embodiment, the elastic part is a compression spring having an adjustable preload.

In one embodiment, the helium injection tube is in a metal tubular structure.

In one embodiment, the helium injection mechanism further includes a pressure gauge and a three-way tee, and the helium injection tube, the isolation valve and the pressure gauge are in respective communication with three ports of the three-way tee.

In one embodiment, the four-position two-way valve is a solenoid valve.

In one embodiment, there are provided a plurality of the helium injection mechanisms, two adjacent helium injection mechanisms are in communication via the isolation valve, and the air inlet is connected to the isolation valve of one of the helium injection mechanisms.

In one embodiment, further including a gas-receiving block with a first gas joint, a second gas joint and a third gas joint, the third gas joint being connected to the isolation valve of the one of the helium injection mechanisms, and the first gas joint and the second gas joint are respectively connected to the air inlet and the isolation valve of an adjacent helium injection mechanism.

Correspondingly, a technical solution adopted in the present application is to provide a helium detection equipment, including the helium detection device according to any one of the above preferred embodiments.

Advantageous effects of the present application are:

For the above helium detection device, when the sealing nozzle needs to be replaced, the finger-clamp mechanism can first enable the clamping assembly to enter the helium injection station, and by exchanging the sealing nozzle with the helium injection tube, the clamping assembly can remove the old sealing nozzle plugged into the helium injection tube, and can also reinstall the new sealing nozzle on the helium injection tube; at the recycling station, the clamping assembly can release the old sealing nozzle and hand it over to the recycling assembly; while at the discharging station, the clamping assembly can capture and clamp the new sealing nozzle output by the discharging assembly. It can be seen that the removal of the old sealing nozzle and the installation of the new sealing nozzle are not dependent on manual labor. Therefore, the aforementioned helium detection device can realize the automatic replacement of the sealing nozzle, thereby significantly improving the efficiency of replacing the sealing nozzle.

By using the four-position two-way valve to connect the helium injection mechanism with the helium filling device, the helium returning device, the vacuum pumping device and the vacuum breaking device, and by switching the state of the four-position two-way valve, the above helium detection device and helium detection equipment realize helium filling operation, helium returning operation, vacuum pumping operation and vacuum breaking operation, and thus the pipeline can be significantly reduced. Moreover, the isolation valve is directly connected with the helium injection tube, which can further reduce pipelines. The reduction of pipeline structure can make the structure of helium injection mechanism simple and easy to maintain. More importantly, fewer pipeline structures can also significantly reduce the adsorption of helium, thereby improving the accuracy of detecting helium.

DETAILED DESCRIPTION

The present application provides a sealed box and a static device. In order to clarify and demystify objectives, technical solutions and effects of the present application, detailed description of the present application will be further made below with reference to the accompanying drawings and examples. It should be understood that the specific embodiments described herein are intended to illustrate rather than to limit the present application.

Figure 1:
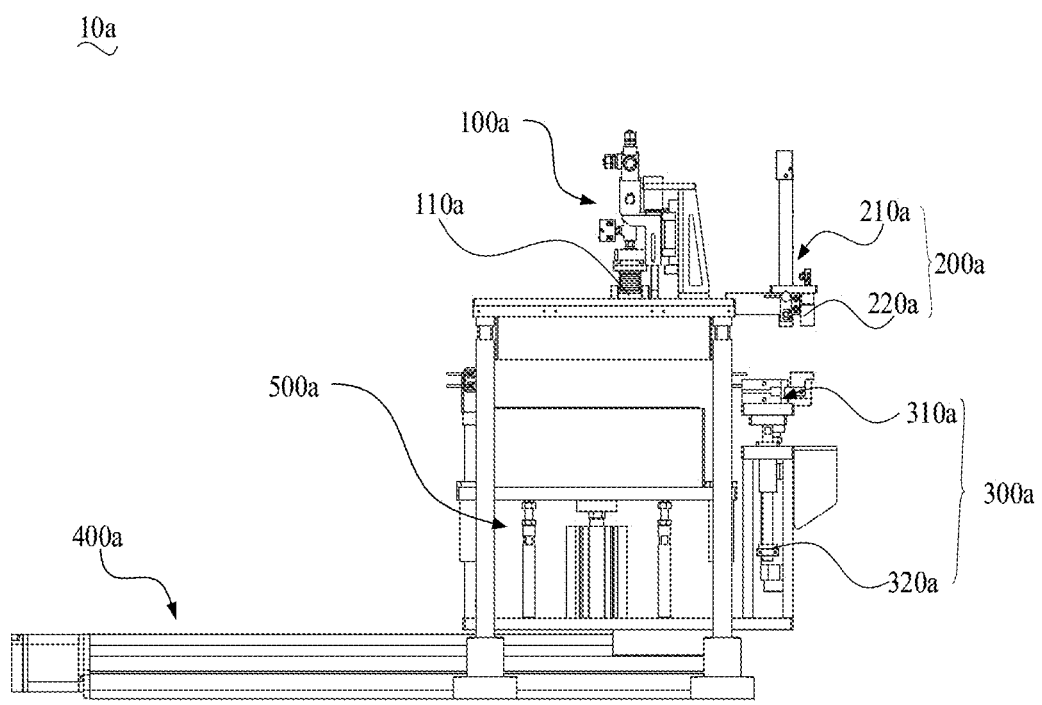
FIG. 1 is a left view of a helium detection device in a preferred embodiment of the present application.

Referring to FIG. 1, the helium detection device 10a in the preferred embodiment of the present application includes a helium injection mechanism 100a, a replacing mechanism 200a and a finger-clamp mechanism 300a.

The helium injection mechanism 100a includes a helium injection tube 110a located at a helium injection station. The helium injection tube 110a is typically a metal tubular structure, and is configured for injecting helium into a workpiece to be inspected, such as a square battery. Specifically, in this embodiment, the helium detection device 10a further includes a lower cavity mechanism 500a. The lower cavity mechanism 500a includes a vacuum box 510a and a jack-up cylinder 520a, and the square battery is placed in the vacuum box 510a. When injecting helium, the lower cavity mechanism 500a is placed at the helium injection station and below helium injection tube 110a. Next, the jack-up cylinder 520a drives the vacuum box 510a and the square battery in the box to rise until the helium injection tube 110a is connected to a helium injection port on the square battery.

Figure 6:
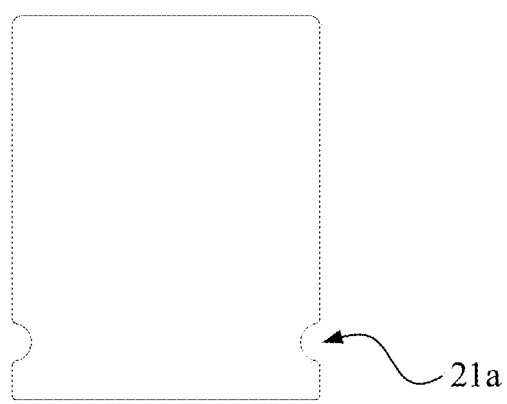
FIG. 6 is a schematic structural view of a sealing nozzle in one embodiment of the present application.

In order to maintain a good seal between the helium injection tube 110a and the helium injection port, one end of the helium injection tube 110a can be fitted with a sealing nozzle 20a as shown in FIG. 6. The sealing nozzle 20a is in a cylindrical structure with open ends and is generally made of a flexible material such as silicone or rubber.

The replacing mechanism 200a includes a discharging assembly 210a and a recycling assembly 220a. Here, the discharging assembly 210a is provided at a feeding station, and is configured for outputting the sealing nozzle 20a; the recycling assembly 220a is provided at a recycling station, and is configured for picking up the sealing nozzle 20a. It should be noted that the sealing nozzle 20a output by the discharging assembly 210a is a new sealing nozzle, while the sealing nozzle 20a picked up by the recycling assembly 220a is the old sealing nozzle.

Figure 2:
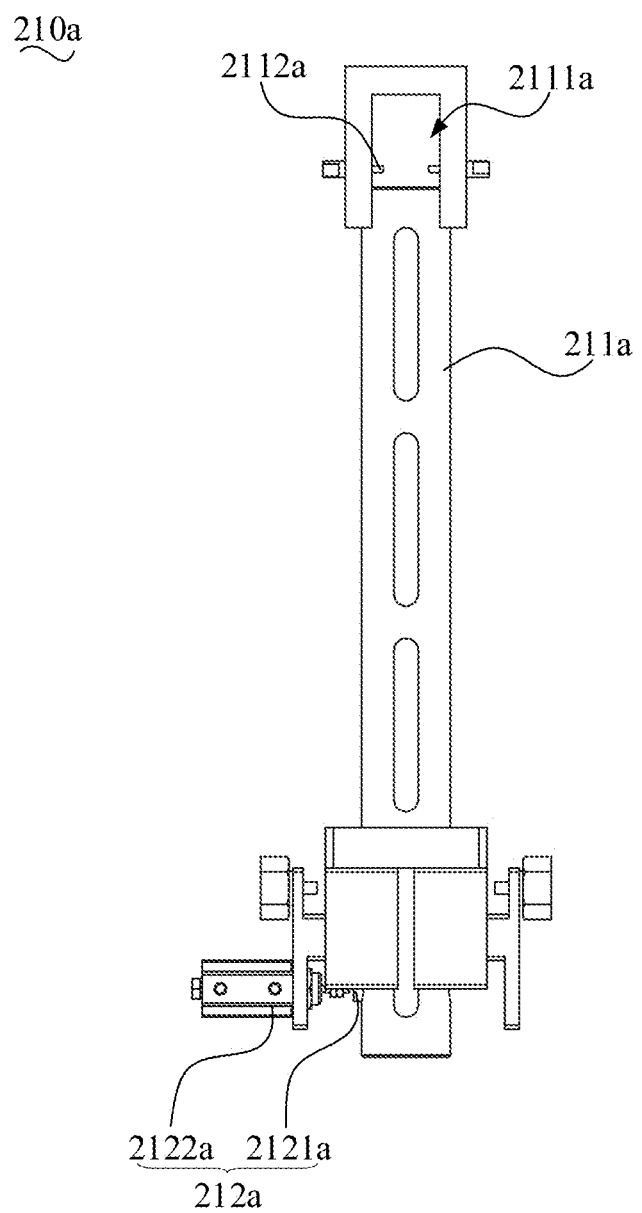
FIG. 2 is a front view of a discharging assembly in the helium detection device shown in FIG. 1.

Referring to FIG. 2, in the present embodiment, the discharging assembly 210a includes a discharging tube 211a and an on-off member 212a, wherein:

The discharging tube 211a is generally a strip-shaped tubular structure, and can be made of metal, plastic, or other materials. The discharging tube 211a is configured for storing the sealing nozzle 20a, and at one end of the discharging tube 211a, there is provided a discharging port (not marked in the figures) which is the output end of the discharging assembly 210a. A plurality of sealing nozzles 20a are stacked on the discharging tube 211a, and can slide down to the discharging port under the influence of gravity. Specifically, the discharging tube 211a is typically a cylindrical tube with a smooth inner wall, and the plurality of sealing nozzles 20a are stacked along the extending direction of the discharging tube 211a. During the actual use of the discharging assembly 210a, the discharging tube 211a extends vertically, and the sealing nozzle 20a stored therein can slide down to the discharging port under the influence of gravity, thereby realizing the output.

The on-off member 212a controls whether the sealing nozzle 20a is output from the discharging tube 211a. Specifically, the on-off member 212a has a blocking state and an open state, and can be switched between the blocking state and the open state. In the blocking state, the on-off member 212a can prevent the sealing nozzle 20a from sliding out of the discharging port, while in the open state, the on-off member 212a allows the sealing nozzle 20a to slide out of the discharging port. Therefore, when it is necessary to output the sealing nozzle 20a, the on-off member 212a may be switched to the open state. At this time, the sealing nozzle 20a can slide down to the discharging port under the influence of gravity without the assistance of other driving elements, thereby contributing to simplifying the structure of the discharging assembly 210a and realizing the process of discharging from the sealing nozzle 20a.

It should be noted that in other embodiments, the discharging assembly 210a may also realize the output of the sealing nozzle 20a in a piston push type, screw feed type, etc.

Further, in the present embodiment, the on-off member 212a includes a jack-up block 2121a and a discharging cylinder 2122a. The jack-up block 2121a is provided on the driving end of the discharging cylinder 2122a and is configured to slidably pass through the side wall of the discharging tube 211a. The discharging cylinder 2122a can drive the jack-up block 2121a into or out of the discharging tube 211a to switch the on-off member 212a between the blocking state and the open state.

Specifically, the side wall of the discharging tube 211a may be provided with a through hole for installing the jack-up block 2121a. The discharging cylinder 2122a may be fixed relative to the discharging tube 211a with a cylinder mounting plate (not marked in the figures). When the discharging cylinder 2122a stretches out, it can drive the jack-up block 2121a to abut against the sealing nozzle 20a in the discharging tube 211a, so as to prevent the nozzle from sliding down from the discharging port, and at this moment, the on-off member 212a is in the blocking state; when the discharging cylinder 2122a retracts, it can drive the jack-up block 2121a to retract, and at this moment, the sealing nozzle 20a can slide down from the discharging port and the on-off member 212a is in the open state.

Since the sealing nozzle 20a is output one by one, a sensor (not shown in the figures) may be provided in the vicinity of the discharging port to detect actions of the sealing nozzle 20a in the discharging tube 211a. When the on-off member 212a switches to the open state and one sealing nozzle 20a falls out of the discharging port, the sensor detects the actions of the sealing nozzle 20a in the discharging tube 211a. At this point, the discharging cylinder 2122a can stretch out again and the on-off member 212a switches to the blocking state.

It should be noted that in other embodiments, the on-off member 212a may also be other structures such as baffles, solenoid valves, etc.

Referring again to FIG. 6, the front and the reverse sides of the sealing nozzle 20a must be discriminated and recognized, as the two ends of the sealing nozzle 20a are structured differently. In order to facilitate the subsequent automatic replacement of the sealing nozzle 20a, all sealing nozzles 20a need to be stacked in a preset orientation when depositing them in the discharging tube 211a.

Specifically, in the present embodiment, the side wall on the end of the discharging tube 211a away from the discharging port is provided with a feeding port 2111a whose inner wall is provided with a plug pin 2112a, and a groove 21a on the sealing nozzle 20a constitutes an avoidance of the plug pin 2112a as the sealing nozzle 20a passes through the feeding port 2111a in a preset orientation.

Specifically, the sealing nozzle 20a has the groove 21a, which is offset from the middle of the sealing nozzle 20a. When the sealing nozzle 20a passes through the feeding port 2111a in the preset orientation, the groove 21a just constitutes an avoidance of the plug pin 2112a, so the sealing nozzle 20a can enter the discharging tube 211a without any problems. Further, when the orientation of the sealing nozzle 20a is reversed, however, the plug pin 2112a will block the sealing nozzle 20a so that the latter cannot be smoothly put into the discharging tube 211a. In this way, all the sealing nozzles 20a put into the discharging tube 211a can only pass through the feeding port 2111a in a preset orientation, thereby realizing fool-proofing.

Specifically, in the present embodiment, a recycling assembly 220a includes an attracting member capable of attracting and releasing the sealing nozzle 20a. The attracting member may be a vacuum tip, and the recycling assembly 220a can attract and release the sealing nozzle 20a by vacuuming the attracting member and breaking the vacuum thereof, which is convenient to operate. Obviously, the recycling assembly 220a may also pick up the sealing nozzle 20a by means of clamping, for example.

Figure 3:
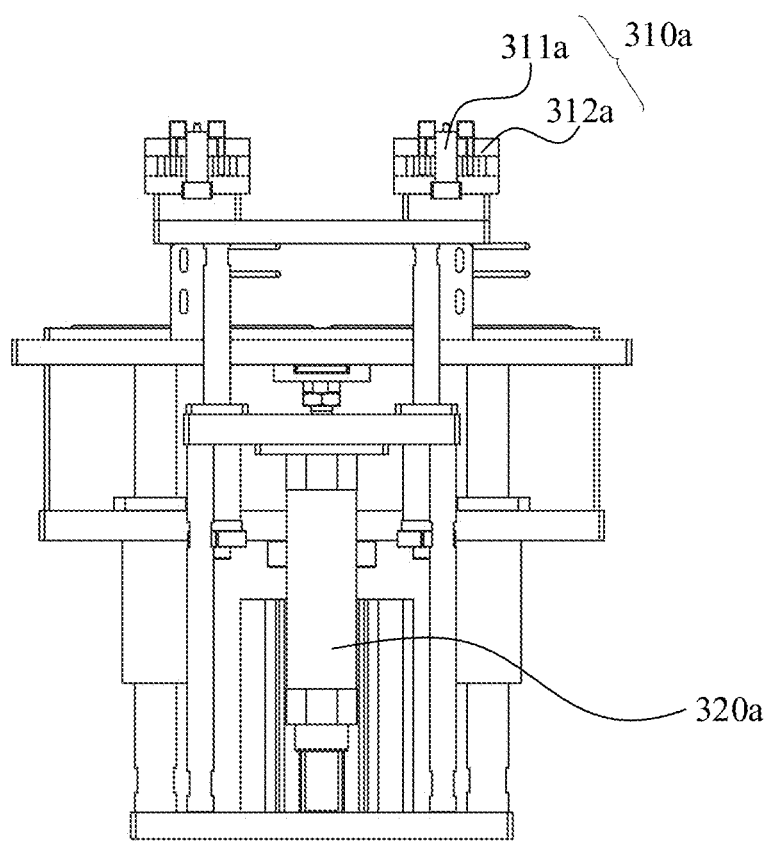
FIG. 3 is a front view of a finger-clamp mechanism and a lower cavity mechanism in the helium detection device shown in FIG. 1.

The finger-clamp mechanism 300a includes a clamping assembly 310a capable of clamping or releasing the sealing nozzle 20a. The clamping assembly 310a can be of various types, such as a jaw type, a hoop type, a snap-in type, and the like. Referring together to FIG. 3, in particular in the present embodiment, the clamping assembly 310a includes a strut 311a and a clamping-jaw 312a, the strut 311a being able to bear the sealing nozzle 20a, the clamping-jaw 312a being provided around the circumference of the strut 311a and being able to be opened or closed.

The clamping-jaw 312a can be controlled by a jaw cylinder, and by controlling air intake or exhaust, the clamping-jaw 312a can be opened or closed. The strut 311a is generally aligned with the extension direction of the helium injection tube 110a. For better positioning of the sealing nozzle 20a, the top of the strut 311a is provided with a boss (not marked in the figures) which can be inserted into the sealing nozzle 20a, thus restraining the sealing nozzle 20a. The clamping-jaw 312a may be closed to clamp the sealing nozzle 20a, and may be opened to release the sealing nozzle 20a. The strut 311a cooperates with the clamping-jaw 312a, which can improve the clamping effect of the sealing nozzle 20a and correct the position of the sealing nozzle 20a on the clamping assembly 310a.

In addition, in order to cooperate with the groove 21a on the side wall of sealing nozzle 20a, the inner wall of the clamping-jaw 312a is also provided with a protrusion (not marked in the figures). The protrusion may cooperate with the groove 21a, so as to ensure that the sealing nozzle 20a is stable and reliable when clamped by the clamping assembly 310a.

Further, the clamping assembly 310a may be moved to a helium injection station, a discharging station and a recycling station to replace the sealing nozzle 20a plugged into the helium injection tube 110a.

Specifically, the clamping assembly 310a can exchange the sealing nozzle 20a with the helium injection tube 110a, the discharging assembly 210a and the recycling assembly 220a, respectively. At the helium injection station, after clamping the sealing nozzle 20a, the clamping assembly 310a can pull out the old sealing nozzle 20a on the helium injection tube 110a by driving the sealing nozzle 20a away from the helium injection tube 110a; the clamping assembly 310a can also drive the sealing nozzle 20a to move toward the helium injection tube 110a until the new sealing nozzle 20a clamped thereon is plugged into the helium injection tube 110a, and then release the sealing nozzle 20a and move away from the helium injection tube 110a, so that a new sealing nozzle 20a is installed in the helium injection tube 110a. At the discharging station, the clamping assembly 310a can be moved to dock with the discharging assembly 210a and clamp the new sealing nozzle 20a output by the discharging assembly 210a. While at the recycling station, the clamping assembly 310a can drive the old sealing nozzle 20a toward the recycling assembly 220a, and then releases the sealing nozzle 20a so that it is picked up by the recycling assembly 220a.

In the present embodiment, the clamping assembly 310a can drive the clamped sealing nozzle 20a to move axially along the helium injection tube 110a, so as to plug the sealing nozzle 20a into the helium injection tube 110a or pull out the sealing nozzle 20a from one end of the helium injection tube 110a.

In this way, the sealing nozzle 20a can maintain a straight up and down movement path during installation and removal, thus avoiding breakage of the sealing nozzle 20a due to excessive crushing during installation and removal.

Specifically, in the present embodiment, the finger-clamp mechanism 300a also includes an elevating assembly 320a, which can drive the clamping assembly 310a to move up and down along the axial direction of the strut 311a, so that the sealing nozzle 20a stretches into or withdraw from the clamping-jaw 312a.

When the sealing nozzle 20a is transferred to the clamping assembly 310a from the helium injection tube 110a, the discharging assembly 210a and the recycling assembly 220a respectively, the elevating assembly 320a drives the clamping assembly 310a up until the sealing nozzle 20a stretches into the clamping-jaw 312a and is carried on the strut 311a. Then, the clamping-jaw 312a is closed, and the elevating assembly 320a drives the clamping assembly 310a down. When the sealing nozzle 20a is transferred from the clamping assembly 310a to the helium injection tube 110a, the elevating assembly 320a drives the clamping assembly 310a up first until the helium injection tube 110a is plugged into the sealing nozzle 20a. Then, the clamping-jaw 312a is opened, and the elevating assembly 320a drives the clamping assembly 310a down to allow the sealing nozzle 20a to withdraw from the range of the clamping-jaw 312a.

It should be noted that in other embodiments, a structure such as a multi-degree-of-freedom manipulator may also be used instead of the elevating assembly 320a.

The finger-clamp mechanism 300a can be provided with a corresponding drive structure therein so as to drive the clamping assembly 310a to flow among the helium injection station, the discharging station and the recycling station. Alternatively, an additional drive structure may be provided and drive finger-clamp mechanism 300a as a whole to flow among the helium injection station, the discharging station and the recycling station.

Referring again to FIG. 1, in the present embodiment, the helium detection device 10a further includes a driving mechanism 400a that drives the finger-clamp mechanism 300a to move to the helium injection station, the discharging station, and the recycling station. The driving mechanism 400a may be composed of a power element such as a motor, a cylinder, an electric cylinder, etc., and its matching transmission elements.

Specifically, the driving mechanism 400a includes a servo motor (not marked in the figures), an electric cylinder (not marked in the figures) and a moving plate 410a, wherein the servo motor and the electric cylinder together drive the moving plate 410a to move in a preset direction. The finger-clamp mechanism 300a is provided on the moving plate 410a and can move with the moving plate 410a. In this way, the structure of the finger-clamp mechanism 300a itself can be simplified.

Specifically, in the present embodiment, the finger-clamp mechanism 300a is also provided with a waste box 330a. The waste box 330a is aligned with the recycling assembly 220a when the driving mechanism 400a drives the finger-clamp mechanism 300a to arrive at the feeding station. The recycling assembly 220a releases the picked sealing nozzle 20a, so that the old sealing nozzle 20a falls into the waste box 330a.

It should be noted that in other embodiments, the waste box 330a may be omitted, and the recycling assembly 220a may be a vacuum suction pipeline connected to a material box, and the attracted old sealing nozzle 20a is directly sucked into the material box.

Further, in the present embodiment, a lower cavity mechanism 500a is linked with the finger-clamp mechanism 300a, and can be moved to the helium injection station under the driving of the driving mechanism 400a.

Specifically, the lower cavity mechanism 500a is fixedly provided on the moving plate 410a. When the finger-clamp mechanism 300a enters the helium injection station under the driving of the driving mechanism 400a, the lower cavity mechanism 500a automatically exits the helium injection station. That is, under the driving of the driving mechanism 400a, the lower cavity mechanism 500a and the finger-clamp mechanism 300a can only alternate but not enter the helium injection station at the same time, thus avoiding mutual interference between them.

Figure 5:
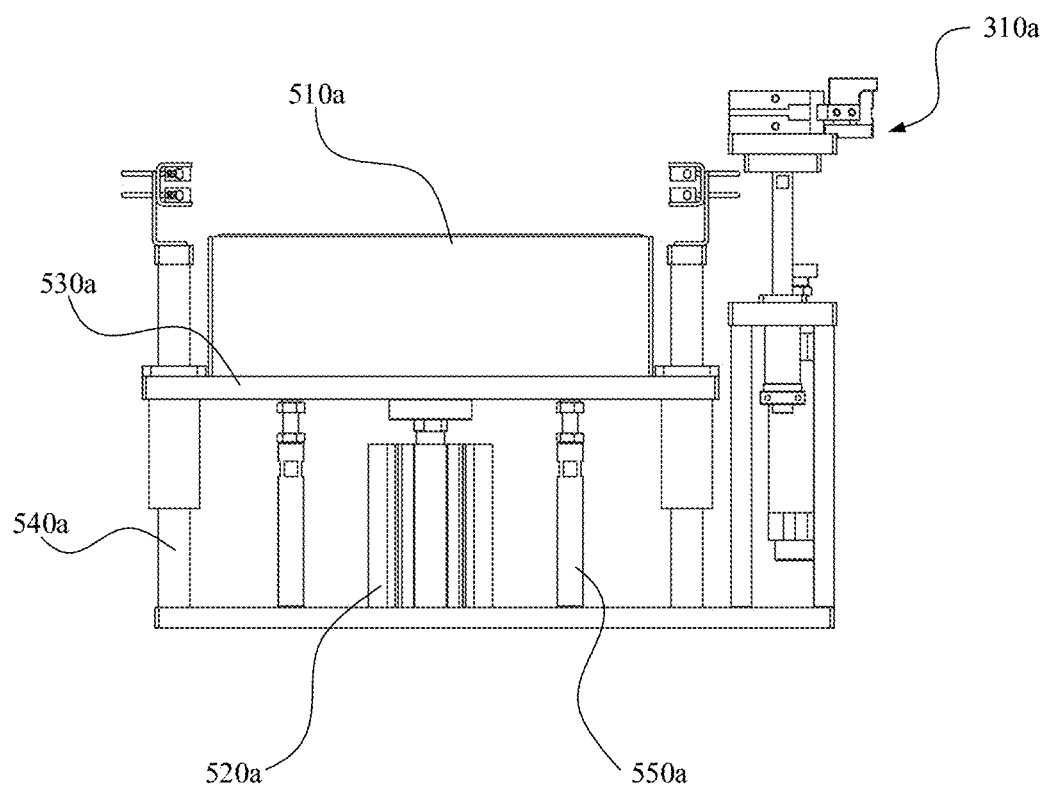
FIG. 5 is a left view of the finger-clamp mechanism and the lower cavity mechanism shown in FIG. 3.

Referring together to FIG. 5, specifically in the present embodiment, the lower cavity mechanism 500a further includes a supporting plate 530a and a guide rod 540a. One end of the guide rod 540a is fixedly provided on the mounting plate of the driving mechanism 400a, and the supporting plate 530a is provided on the guide rod 540a through a linear bearing, so that the supporting plate 530a may slide along the extending direction of the guide rod 540a. The vacuum box 510a is fixedly provided on the supporting plate 530a. The jack-up cylinder 520a is connected to the supporting plate 530a by drive and can drive the supporting plate 530a to slide along the guide rod 540a, thereby driving the vacuum box 510a up and down.

Further, in the present embodiment, the lower cavity mechanism 500a also includes a stop screw 550a. After the vacuum box 510a has been raised into place, the stop screw 550a is able to hold the vacuum box 510a in place, thus allowing the helium injection process to remain stable.

Figure 4:
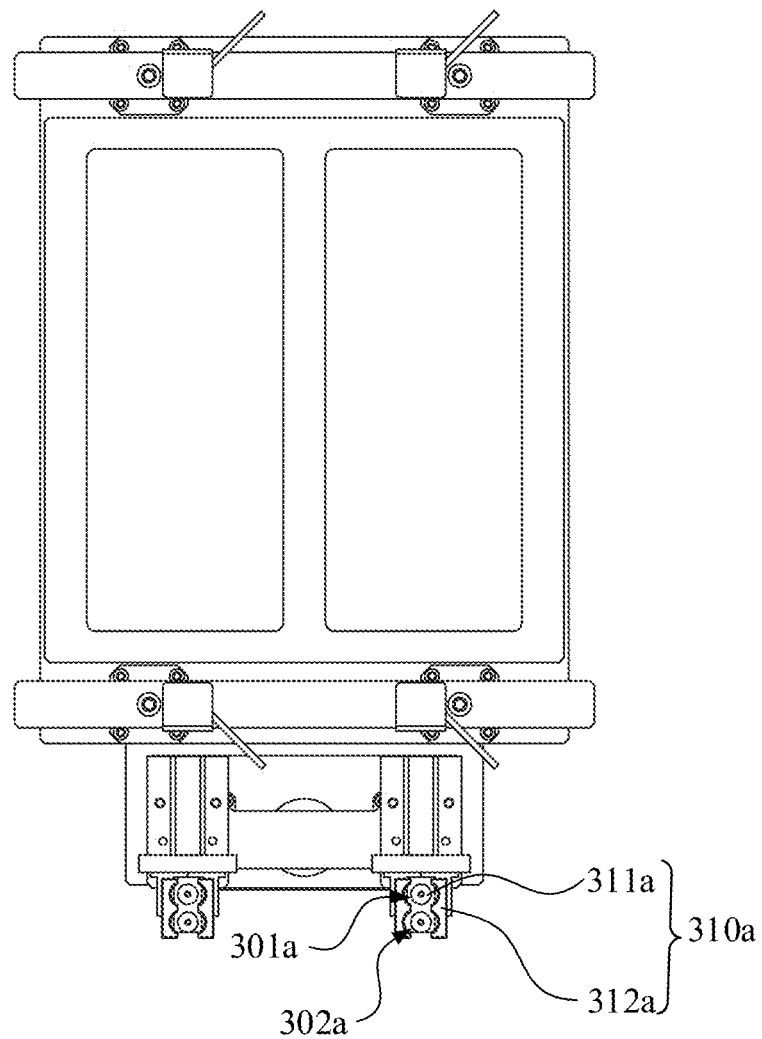
FIG. 4 is a top view of the finger-clamp mechanism and the lower cavity mechanism shown in FIG. 3.

Referring together to FIG. 4, in the present embodiment, the finger-clamp mechanism 300a has a first station 301a and a second station 302a spaced apart from each other, and a clamping assembly 310a is provided on the first station 301a and the second station 302a. The clamping assembly 310a located on the second station 302a is configured for capturing the sealing nozzle 20a output by the discharging assembly 210a, and transferring the sealing nozzle 20a to the helium injection tube 110a, while the clamping assembly 310a located on the first station 301a is configured for capturing the sealing nozzle 20a plugged in the helium injection tube 110a, and transferring the sealing nozzle 20a to the recycling assembly 220a.

That is, disassembly of the old sealing nozzle 20a and installation of the new sealing nozzle 20a are performed by different clamping assemblies 310a. In this way, it is able to avoid cross-contamination.

The replacement process of sealing nozzle 20a for the above helium detection device 10a is roughly described as follows in conjunction with accompanying drawings 1 to 6:

Before the helium injection mechanism 100a performs the helium injection process, the finger-clamp mechanism 300a enters the helium injection station under the driving of the driving mechanism 400a, and aligns the clamping assembly 310a located at the first station 301a with the end of the helium injection tube 110a; then, the elevating assembly 320a jacks up the clamping assembly 310a, the strut 311a of the clamping assembly 310a at the first station 301a bears the sealing nozzle 20a, and the clamping-jaw 312a is closed and clamps the sealing nozzle 20a; finally, the elevating assembly 320a retracts, and drives the clamping assembly 310a to move downward, thereby pulling out the old sealing nozzle 20a.

After the old sealing nozzle 20a is pulled out, the finger-clamp mechanism 300a is under the driving of the driving mechanism 400a to arrive at the recycling station, and aligns the clamping assembly 310a located at the first station 301a with the recycling assembly 220a; the elevating assembly 320a jacks up the clamping assembly 310a again until the old sealing nozzle 20a is sent to the recycling assembly 220a; then, the clamping-jaw 312a is opened, and the elevating assembly 320a retracts to drive the clamping assembly 310a to move downward, thereby transferring the old sealing nozzle 20a to the recycling assembly 220a for recycling.

After the old sealing nozzle 20a is recycled, the finger-clamp mechanism 300a is under the driving of the driving mechanism 400a to arrive at the feeding station and aligns the clamping assembly 310a located at second station 302a with the output end of discharging assembly 210a; the new sealing nozzle 20a falls from the discharging tube 211a onto the strut 311a located at the second station 302a, and the clamping-jaw 312a is closed to clamp the nozzle 20a, so as to realize the feeding of the new sealing nozzle 20a;

After the sealing nozzle 20a is fed, the finger-clamp mechanism 300a enters the helium injection station under the driving of the driving mechanism 400a, and aligns the clamping assembly 310a located at the second station 302a with the end of the helium injection tube 110a; the elevating assembly 320a jacks up the clamping assembly 310a until the clamped new sealing nozzle 20a is plugged in the helium injection tube 110a; then, the clamping-jaw 312a is opened, and the elevating assembly 320a retracts and drives the clamping assembly 310a to move down, so that a new sealing nozzle 20a is installed at the end of the helium injection tube 110a.

Obviously, before pulling out the old sealing nozzle 20a, the finger-clamp mechanism 300a can be brought to the feeding station, and the new sealing nozzle 20a can be transferred to the clamping assembly 310a located at the second station 302a. After the clamping assembly 310a located at the first station 301a pulls out the old sealing nozzle 20a on the helium injection tube 110a, the driving mechanism 400a directly drives the clamping assembly 310a located at the second station 302a to align with the end of the helium injection tube 110a. Then, the elevating assembly 320a and the clamping assembly 310a operate to install the new sealing nozzle 20a on the end of the helium injection tube 110a. In this way, the travel of the driving mechanism 400a during the replacement of the sealing nozzle 20a can be reduced, helping to further improve efficiency.

It should be noted that in other embodiments, the clamping assembly 310a on the first station 301a can also be used for replacing the new sealing nozzle 20a, and the clamping assembly 310a on the second station 302a can be used for recycling the old sealing nozzle 20a. At this time, while the clamping assembly 310a at the first station 301a is taking on the new sealing nozzle 20a, the clamping assembly 310a at the second station 302a can transfer the old sealing nozzle 20a to the recycling assembly 220a, thus being able to further improve the efficiency of replacing the sealing nozzle. Alternatively, only one clamping assembly 310a may be installed on the finger-clamp mechanism 300a, and the same clamping assembly 310a can perform the extraction of the old sealing nozzle 20a and the installation of the new sealing nozzle 20a.

For the above helium detection device 10a, when the sealing nozzle 20a needs to be replaced, the finger-clamp mechanism 300a can first enable the clamping assembly 310a to enter the helium injection station, and by exchanging the sealing nozzle 20a with the helium injection tube 110a, the clamping assembly 310a can remove the old sealing nozzle 20a plugged into the helium injection tube 110a, and can also reinstall the new sealing nozzle 20a on the helium injection tube 110a; at the recycling station, the clamping assembly 310a can release the old sealing nozzle 20a and hand it over to the recycling assembly 220a; while at the discharging station, the clamping assembly 310a can capture and clamp the new sealing nozzle 20a output by the discharging assembly 210a. It can be seen that the removal of the old sealing nozzle 20a and the installation of the new sealing nozzle 20a are not dependent on manual labor. Therefore, the aforementioned helium detection device 10a can realize the automatic replacement of the sealing nozzle 20a, thereby significantly improving the efficiency of replacing the sealing nozzle 20a.

Figure 7:
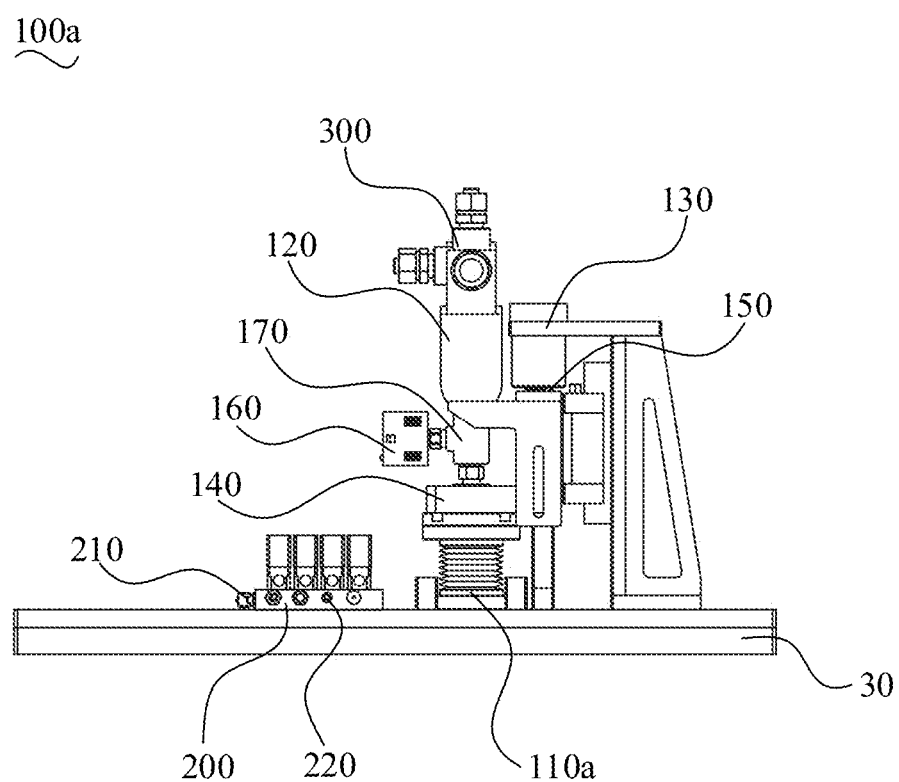
FIG. 7 is a left view of a helium injection mechanism in the helium detection device shown in FIG. 1.

Referring to FIG. 7, a helium detection device (not shown in the figures) is provided by the present application, and the helium detection device includes a helium injection mechanism 100a. The aforementioned helium detection device further includes a helium filling device (not shown in the figures), a helium returning device (not shown in the figures), a vacuum pumping device (not shown in the figures), and a vacuum breaking device (not shown in the figures).

The vacuum pumping device evacuates the vacuum box used for loading a workpiece to be inspected to form a vacuum environment; the helium filling device supplies helium, and injects the helium into the workpiece to be inspected located in the vacuum box through the helium injection mechanism 100a, such as a square battery; after holding the pressure for a preset time, the helium returning device recycles the helium from the workpiece and inspects the airtightness of the workpiece by calculating the concentration of helium in the vacuum box; after the inspection is completed, the vacuum breaking device restores the air pressure in the vacuum box. Specifically, in the present embodiment, the vacuum breaking device is a muffler.

Figure 8:
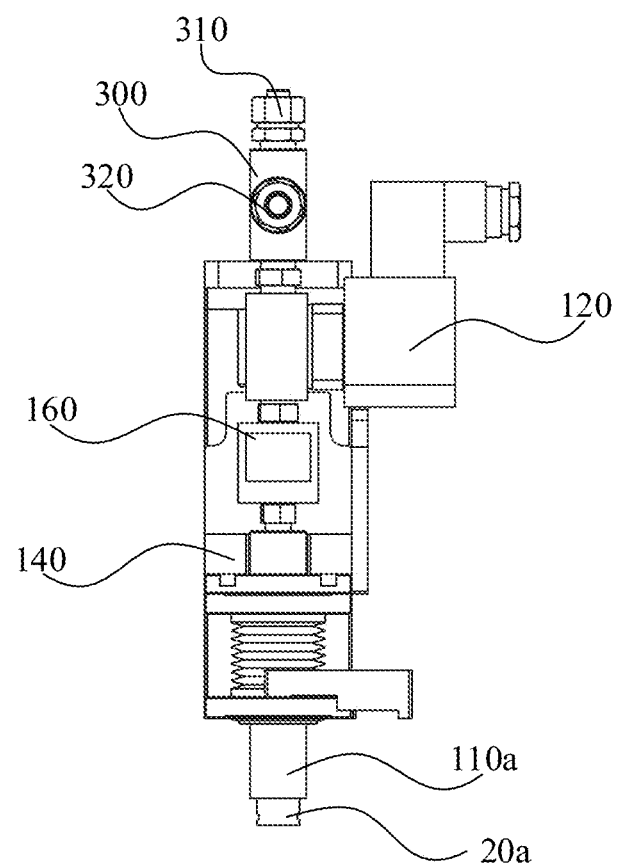
FIG. 8 is a rear view of the helium injection mechanism shown in FIG. 7.

Referring together to FIG. 8, the helium detection device in the preferred embodiment of the present application includes a helium injection mechanism 100a and a four-position two-way valve 200, wherein:

The helium injection mechanism 100a includes the helium injection tube 110a and an isolation valve 120. The helium injection tube 110a is generally in a bar-shaped tubular structure with both ends open. One end of the helium injection tube 110a is provided with an injection port (not marked in the figures) which is capable of docking with the helium injection port of the workpiece to be inspected. The isolation valve 120 is fixed on the end of the helium injection tube 110a away from the injection port and is in communication with the helium injection tube 110a. When helium detection is performed on the workpiece to be inspected, the helium gas supplied by the helium injection mechanism enters into the helium injection tube 110a through the isolation valve 120, and is injected into the workpiece to be inspected from the injection port of the helium injection tube 110a. Then, the isolation valve 120 is closed, so that it is possible to hold the pressure of the workpiece to be inspected injected with the helium gas.

In order to improve the sealing performance between the injection port and the helium injection port, a helium-injecting sealing nozzle 20a is also installed on the injection port, and the helium-injecting sealing nozzle 20a may be a member formed by flexible materials such as rubber and silica gel. When the injection port and the helium injection port are docked, the helium-injecting sealing nozzle 20a can be elastically deformed by extrusion to fill the gap between the injection port and the helium injection port, thereby achieving a better sealing effect.

Specifically, in the present embodiment, the helium injection tube 110a is a metallic tubular structure. The helium injection tube 110a may be formed from metallic materials such as stainless steel. On the one hand, the metallic tubular structure has a high mechanical strength, which prevents the helium injection tube 110a from being deformed during the helium injection process. On the other hand, the metallic tubular structure can effectively reduce the helium absorption and helium accumulation in the helium injection tube 110a, thereby improving the accuracy of detecting helium.

Specifically, in the present embodiment, the helium injection mechanism 100a further includes a pressure gauge 160 and a three-way tee 170, and the helium injection tube 110a, the isolation valve 120, and the pressure gauge 160 are in respective communication with the three ports of the three-way tee 170.

The three-way tee 170 is a hollow block structure with three ports, and is generally formed of metal. The pressure gauge 160 can detect the air pressure in the workpiece to be inspected, thus facilitating the control of the amount of the helium gas filled into the workpiece to be inspected. Moreover, the helium injection tube 110a, the isolation valve 120 and the pressure gauge 160 are directly connected through the three-way tee 170 without an additional pipeline for communicating them with each other, thereby further reducing the adsorption of the helium gas.

The four-position two-way valve 200 has an air inlet 210 and four air outlets 220, wherein the air inlet 210 is capable of alternately conducting with the four air outlets 220. Specifically, the four-position two-way valve 200 has four on-off states, and in a particular on-off state, the air inlet 210 is in conduction with a corresponding one air outlet 220 and isolated from the other air outlets 220. Further, the four-position two-way valve 200 is connected in reverse, the air inlet 210 is connected to the helium injection tube 110a through the isolation valve 120, and the four air outlets 220 are respectively connected to the helium filling device, the helium returning device, the vacuum pumping device and the vacuum breaking device.

The helium detection equipment generally has a top plate 30 that acts as a support, and the four-position two-way valve 200 and the helium injection mechanism 100a can be fixed on a surface of the top plate 30. Here, the air inlet 210 of the four-position two-way valve 200 can be connected with the isolation valve 120 through a pipeline (not shown in the figures).

When detecting helium, it is possible to realize helium filling operation, helium returning operation, vacuum pumping operation and vacuum breaking operation by switching the state of the four-position two-way valve 200, and the number of the pipelines can be significantly reduced. Moreover, the isolation valve 120 is directly connected with the helium injection tube 110a, which can further reduce the number of pipelines. The reduction of the pipeline structure can reduce the adsorption of helium gas, thereby improving the accuracy of detecting helium.

Specifically, in the present embodiment, the four-position two-way valve 200 is a solenoid valve. Therefore, on-off states of the four-position two-way valve 200 can be switched by inputting different electrical signals, so it is possible to respond quickly and switch easily. Obviously, it is also possible to mechanically control the four-position two-way valve 200 to switch the on-off states.

Referring again to FIG. 7, in the present embodiment, the helium injection mechanism 100*a* includes a fixed base 130 where the helium injection tube 110*a* is installed, and the helium injection tube 110*a* is capable of stretching out and drawing back along the longitudinal direction of the injection port with respect to the fixed base 130.

Specifically, the fixed base 130 acts as a support and can be fixedly mounted on the top plate 30 of the helium detection equipment. When the helium detection equipment is in operation, the helium injection tube 110*a* generally extends in a vertical direction, so the longitudinal direction of the injection port is the up and down direction shown in FIG. 7.

When detecting helium, the vacuum box located at the lower part of the helium injection mechanism 100*a* is jacked up until the helium injection port of the workpiece to be inspected inside the box is docked with the injection port of the helium injection tube 110*a*. Since the helium injection mechanism 100*a* is capable of stretching out and drawing back, the helium injection tube 110*a* will be forced to retract when the helium injection port and the injection port abut, thereby avoiding damage to the helium injection tube 110*a* and the workpiece to be inspected due to hard contact between the helium injection tube 110*a* and the helium injection port.

Further, in the present embodiment, the helium injection mechanism 100*a* also includes a mounting plate 140 and an elastic part 150, the mounting plate 140 is installed on the fixed base 130 in such a way as to be slidable along the longitudinal direction of the injection port, the helium injection tube 110*a* is fixedly installed on the mounting plate 140, and the elastic part 150 provides an elastic force on the mounting plate 140 along the longitudinal direction of the injection port and away from the fixed base 130.

Specifically, the mounting plate 140 is slidably mounted on the fixed base 130 through the cooperation of a guide rail and a slider, and the guide rail extends in the up and down direction as shown in FIG. 7. Moreover, the helium injection port and the injection port are effectively tightened by the elastic force of the elastic part 150, thereby further improving the sealing effect between the two.

Obviously, in other embodiments, the helium injection tube 110*a* can also be made to stretch out and draw back elastically in other ways. For example, the helium injection tube 110*a* is provided with a corrugated section capable of elastic deformation. Alternatively, a cylinder is provided, wherein the cylinder is fixed to the fixed base 130 and the helium injection tube 110*a* is fixed to the driving end of the cylinder, thereby enabling the helium injection tube 110*a* to stretch out and draw back relative to the fixed base 130.

Specifically, in the present embodiment, the elastic part 150 is a compression spring, and the compression spring has an adjustable preload. Specifically, the compression spring is clamped between the fixed base 130 and the mounting plate 140. When the helium injection port abuts against the injection port, the helium injection tube 110*a* is forced to retract, thereby further compressing the compression spring. By adjusting the preload of the compression spring, it is possible to adjust the amount of elastic return force provided by the elastic part 150, thereby adjusting the tightness of the helium injection port against the injection port as desired.

In the present embodiment, there are provided multiple helium injection mechanisms 100*a*, wherein two adjacent helium injection mechanisms 100*a* are connected through the isolation valve 120, and the air inlet 210 is connected to the isolation valve 120 of one of the helium injection mechanisms 100*a*.

Specifically, the helium gas supplied by the helium filling device can be distributed to multiple helium injection mechanisms 100*a* through a four-position two-way valve 200, and the helium gas recycled by the multiple helium injection mechanisms 100*a* can be collected to the helium returning device through the four-position two-way valve 200. In this way, by providing one four-position two-way valve 200, it is possible to control the working process of the multiple helium injection mechanisms 100*a*, thus enabling simultaneous detection of helium in multiple workpieces to be inspected.

Further, in the present embodiment, the helium injection mechanism 100*a* also includes a gas-receiving block 300 which has a first gas joint 310, a second gas joint 320 and a third gas joint (not shown in the figures), wherein the third gas joint is connected to the isolation valve 120 of one of the helium injection mechanisms 100*a*, and the first gas joint 310 and the second gas joint 320 are respectively connected to the air inlet 210 and the isolation valve 120 of the adjacent helium injection mechanism 100*a*.

The gas-receiving block 300 may be a metal-formed hollow structure. Specifically, the isolation valve 120 itself has several gas joints (not marked in the figures), and the gas-receiving block 300 can be docked with any gas joint on the isolation valve 120, thereby increasing the number of ports of the isolation valve 120 to facilitate the connection of an adjacent helium injection mechanism 100*a* and the helium injection mechanism 100*a* to the four-position two-way valve 200.

Figure 9:
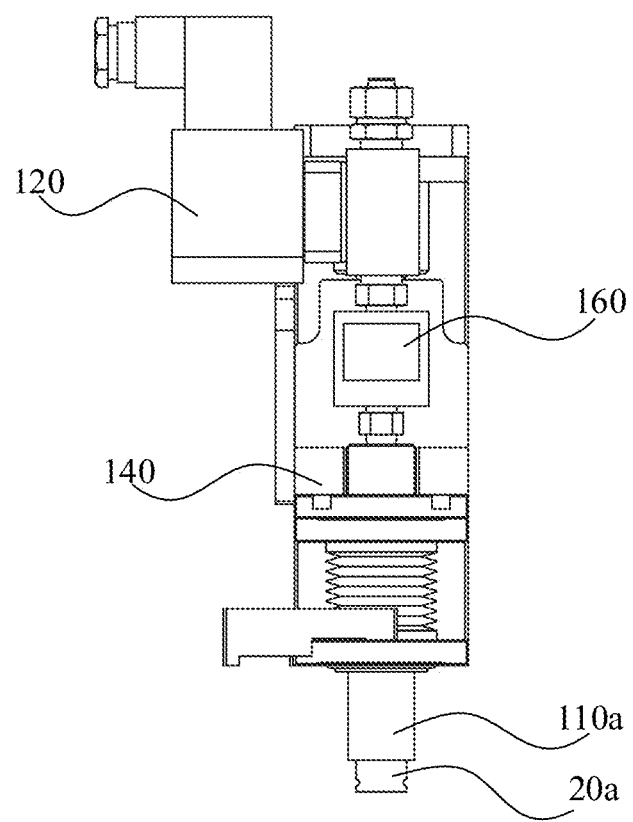
FIG. 9 is a rear view of the helium injection mechanism in another embodiment of the present application.

As shown in FIG. 9, for an embodiment in which the helium detection device includes one helium injection mechanism 100*a*, the gas-receiving block 300 can be omitted. At this time, the air inlet 210 of the four-position two-way valve 200 can be directly connected to the gas joint provided by the isolation valve 120 itself.

By using the four-position two-way valve 200 to connect the helium injection mechanism 100*a* with the helium filling device, the helium returning device, the vacuum pumping device and the vacuum breaking device and by switching the state of the four-position two-way valve 200, the above helium detection device and helium detection equipment realize helium filling operation, helium returning operation, vacuum pumping operation and vacuum breaking operation, and therefore the number of the pipelines can be significantly reduced. Moreover, the isolation valve 120 is directly connected with the helium injection tube 110*a*, which can further reduce the number of pipelines. The reduction of pipeline structure can make the structure of helium injection mechanism simple and easy to maintain. More importantly, fewer pipeline structures can also significantly reduce the adsorption of helium, thereby improving the accuracy of detecting helium.

It can be understood that for those skilled in the art, equivalent replacements or changes can be made according to the technical solutions and concepts of the application, and all these changes or replacements shall fall within the scope of protection of the claims appended to the present application.

The invention claimed is:

1. A helium detection device, comprising:
a helium injection mechanism including a helium injection tube provided at a helium injection station, one end of the helium injection tube adapted to be plugged into by a sealing nozzle;
a replacing mechanism including a discharging assembly for outputting the sealing nozzle and a recycling assembly for picking up the sealing nozzle, the discharging assembly being provided at a feeding station, and the recycling assembly being provided at a recycling station; and
a finger-clamp mechanism including a clamping assembly adapted for clamping or releasing the sealing nozzle and moving to the helium injection station, the discharging station, and the recycling station to replace the sealing nozzle plugged into the helium injection tube.

2. The helium detection device of claim 1, wherein the finger-clamp mechanism has a first station and a second station spaced apart, and the clamping assembly is provided at each of the first station and the second station, the clamping assembly located at the second station being configured for capturing the sealing nozzle output by the discharging assembly and transferring the sealing nozzle to the helium injection tube, the clamping assembly located at the first station being configured for capturing the sealing nozzle plugged into the helium injection tube and transferring the sealing nozzle to the recycling assembly.

3. The helium detection device of claim 1, wherein the clamping assembly is adaptable to drive the clamped sealing nozzle to move along an axial direction of the helium injection tube, to plug the sealing nozzle into the helium injection tube or to pull out the sealing nozzle from one end of the helium injection tube.

4. The helium detection device of claim 1, wherein the clamping assembly comprises: a strut adapted for bearing the sealing nozzle, and a clamping-jaw circumferentially provided around the strut and configured to be opened or closed.

5. The helium detection device of claim 4, wherein the finger-clamp mechanism further comprises an elevating assembly adapted for driving the clamping assembly up and down along an axial direction of the strut, thereby the sealing nozzle stretching into or withdrawing from the clamping-jaw.

6. The helium detection device of claim 1, wherein the discharging assembly comprises:
a discharging tube for storing the sealing nozzle, the discharging tube being provided with a discharging port at one end of the discharging tube, a plurality of sealing nozzles being stacked on the discharging tube and adapted to slide down to the discharging port under the influence of gravity;
an on-off member having a blocking state for preventing the sealing nozzle from sliding out of the discharging port and an open state for allowing the sealing nozzle to slide out of the discharging port, the on-off member being adapted to switch between the blocking state and the open state.

7. The helium detection device of claim 6, wherein the on-off member comprises a jack-up block and a discharging cylinder, the jack-up block being provided on a driving end of the discharging cylinder and configured to be slidable through a side wall of the discharging tube, the discharging cylinder being capable of driving the jack-up block to insert into or withdraw from the discharging tube such that the on-off member adapted for switching between the blocking state and the open state.

8. The helium detection device of claim 6, wherein a feeding port is provided on a side wall of the discharging tube away from the discharging port, a plug pin is provided on an inner wall of the feeding port, and when the sealing nozzle passes through the feeding port in a preset orientation, a groove on the sealing nozzle constitutes an avoidance of the plug pin.

9. The helium detection device of claim 1, wherein the recycling assembly comprises an attracting member adapted for attracting and releasing the sealing nozzle.

10. The helium detection device of claim 1, characterized by further comprising a driving mechanism and a lower cavity mechanism, the driving mechanism being adapted for driving the finger-clamp mechanism to the helium injection station, the discharging station, and the recycling station, the lower cavity mechanism being linked with the finger-clamp mechanism and adapted for moving to the helium injection station under the driving of the driving mechanism.

11. The helium detection device of claim 1, wherein the helium injection mechanism further comprises an isolation valve, the helium injection tube is provided with an injection port at one end of the helium injection tube, and the isolation valve is fixed on one end of the helium injection tube away from the injection port and is in communication with the helium injection tube;
the helium detection device further includes a four-position two-way valve with an air inlet and four air outlets, the air inlet being adapted for conducting with the four air outlets alternately;
wherein, the air inlet is connected to the helium injection tube through the isolation valve, and the four air outlets are configured to connect respectively to a helium filling device, a helium returning device, a vacuum pumping device, and a vacuum breaking device.

12. The helium detection device of claim 11, wherein the helium injection mechanism includes a fixed base, and the helium injection tube is installed on the fixed base and adapted for stretch out and draw back along a longitudinal direction of the injection port relative to the fixed base.

13. The helium detection device of claim 12, wherein the helium injection mechanism further includes a mounting plate and an elastic part, the mounting plate is installed on the fixed base in such a way as to be slidable along the longitudinal direction of the injection port, the helium injection tube is fixedly provided on the mounting plate, and the elastic part provides an elastic force on the mounting plate along the longitudinal direction of the injection port and away from the fixed base.

14. The helium detection device of claim 13, wherein the elastic part comprises a compression spring having an adjustable preload.

15. The helium detection device of claim 11, wherein the helium injection tube is in a metal tubular structure.

16. The helium detection device of claim 11, wherein the helium injection mechanism further includes a pressure gauge and a three-way tee, and the helium injection tube, the isolation valve, and the pressure gauge are in respective communication with three ports of the three-way tee.

17. The helium detection device of claim 11, wherein the four-position two-way valve comprises a solenoid valve.

18. The helium detection device of claim 11, wherein there are provided a plurality of the helium injection mechanisms, two adjacent helium injection mechanisms are in communication via the isolation valve, and the air inlet is connected to the isolation valve of one of the helium injection mechanisms.

19. The helium detection device of claim 18, further comprising a gas-receiving block with a first gas joint, a second gas joint, and a third gas joint, the third gas joint being connected to the isolation valve of the one of the helium injection mechanisms, and the first gas joint and the second gas joint are respectively connected to the air inlet and the isolation valve of an adjacent helium injection mechanism.

20. A helium detection equipment, comprising a helium detection device of claim 1.

* * * * *